Oct. 13, 1942.    R. H. PHELPS    2,298,585
AUTOMOTIVE SUSPENSION
Filed March 29, 1940
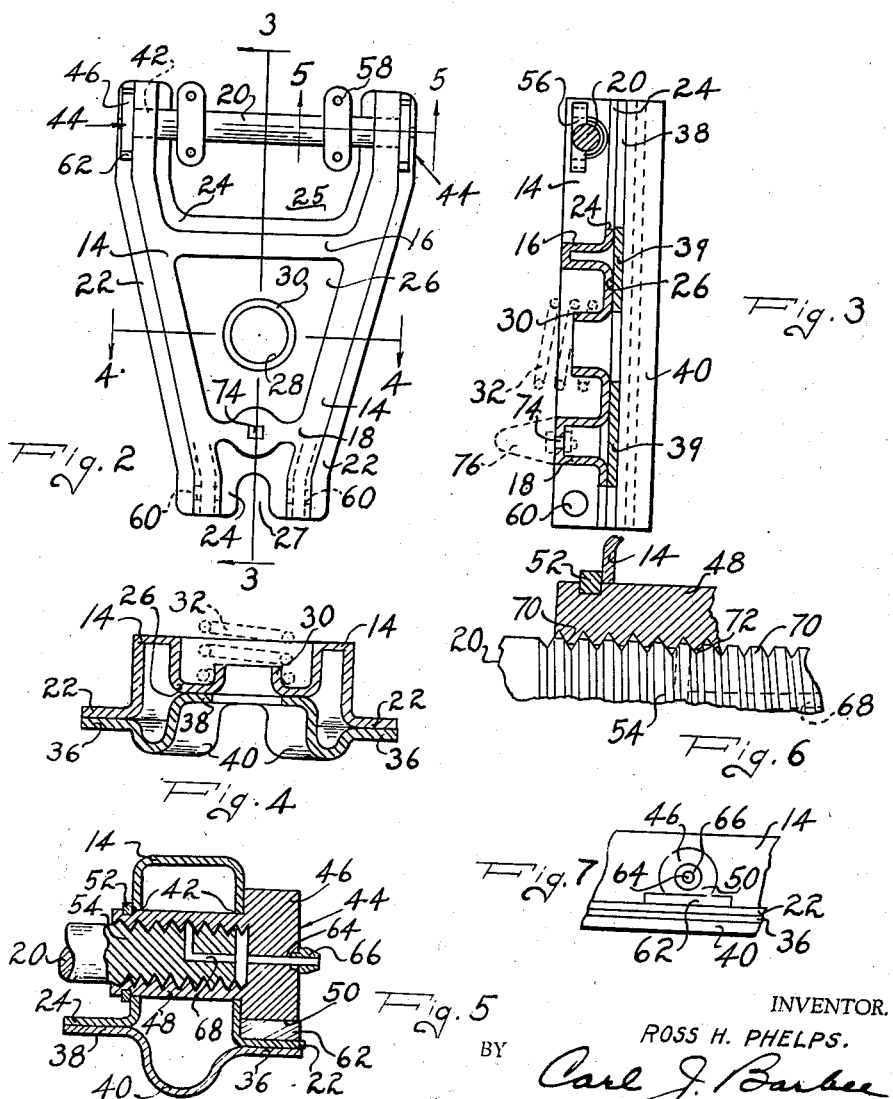
INVENTOR.
ROSS H. PHELPS.
BY Carl J. Barbee
ATTORNEY.

Patented Oct. 13, 1942

2,298,585

UNITED STATES PATENT OFFICE 2,298,585

AUTOMOTIVE SUSPENSION

Ross H. Phelps, Kenosha, Wis., assignor to Nash-Kelvinator Corporation, Kenosha, Wis., a corporation of Maryland Application March 29, 1940, Serial No. 326,556

15 Claims. (Cl. 267—20)

This invention relates to automotive suspension and has particular reference to a novel type of control arm for an independent wheel suspension.

A common type of independent suspension is the so-called parallel arm suspension in which two generally parallel arms are pivoted to the frame of the automobile and support the ends of the steering knuckle support arm between their outer ends. The lower of these two arms usually supports a coil spring, the other end of which abuts against a portion of the frame. In the past these lower control arms have been made of relatively heavy forgings which are both expensive and increase the unsprung weight which must be moved as the wheels pass over uneven ground.

It is an object of this invention to provide a novel lower control arm which will be more easily constructed and which will be lighter in weight.

The use of a coil spring in parallel arm suspensions has had the disadvantage of the lack of any friction in the spring such as would compare with the friction between the leaves of a leaf spring. As a consequence all of the shock imparted to a wheel in passing over a bump is passed directly to the automobile frame, the spring serving only to spread out the time during which this energy is applied to the frame.

It is another object of my invention to provide means in a parallel arm suspension for absorbing some of the shock energy in the wheel by means of friction.

It is another object of my invention to provide a control arm which is made up largely of stampings.

It is another object of my invention to provide a novel means for attaching a control arm formed of stampings to an automobile frame.

Other objects and advantages of my invention will be apparent from a consideration of the following description and the attached drawings of which there is one sheet and in which Figure 1 represents a prospective view of a control arm embodying my invention;

Figure 2 represents a plan view of my control arm;

Figure 3 represents a sectional view taken along the line 3—3 of Figure 2 and looking in the direction of the arrows;

Figure 4 represents a sectional view taken along the line 4—4 of Figure 2 and looking in the direction of the arrows;

Figure 5 represents a sectional view taken along the line 5—5 of Figure 2 and looking in the direction of the arrows;

Figure 6 is a sectional view illustrating in enlarged scale a portion of the structure illustrated in Figure 5; and Figure 7 is a side elevational view illustrating the connection shown in Figure 5.

The control arm consists generally of an upper stamping 10 and a lower stamping 12. The upper stamping is deformed along each side to provide raised rib sections 14. These rib sections 14 are arranged to converge toward the outer end of the upper stamping 10. The ribs 14 are joined adjacent the inner and outer ends of the arm by reinforcing ribs 16 and 18 which function as braces to increase the rigidity of the upper stamping and which are arranged generally longitudinally of the vehicle. It will be noted that ribs 14 lie parallel adjacent their inner and outer ends to facilitate the attachment of a pivot pin or bar 20 as will be described hereinafter.

More particularly, the upper stamping 10 is so shaped that the rib sections 14 are channel-shaped in cross section (see Figure 4) and are provided with the horizontal flange 22 on the outside of the control arm. The inside of the stamping 10 is cut away at its inner and outer ends as shown at 25 and 27 in Figure 2 and is provided with horizontal flanges 24 which I have shown to be located at a slightly higher level than the outside flange 22.

Within the space bounded by the rib sections 14 and the braces 16 and 18, a flange 26, lying at the same level as flange 24, forms a continuous web except for a hole 28 around the edges of which the flange 26 is shaped upwardly to form an annular flange 30. The continuous flange 26 forms a seat for a coil spring indicated in dotted lines at 32 in Figures 3 and 4 and the annular flange 30 serves to retain the spring in its proper position.

The lower stamping 12 conforms generally in outline to the upper stamping 10 and is provided with outer flanges 36 which are arranged to seat upon the under side of the outer flanges 22 of the upper stamping 10 and with inner flanges 38 which are arranged to seat upon the under side of the inner flanges 24 of the upper stamping. The inner flange 38 of the lower stamping may be carried continuously under the braces 16 and 18 as shown at 39 in Figure 3 or may be channel-shaped to increase the section modulus of the ribs so formed. Between the flanges 36 and 38 the lower stamping is deformed downwardly as at 40 to provide a rib so that the cross section of the control arm as a whole consists of two upper rectangular portions and two lower curved portions forming a pair of converging box-shaped ribs. The mating flanges of the upper and lower stampings are joined by suitable means such as welding so that a rigid unit is formed of the two parts. It will be noted that this construction provides a control arm, the strengthening parts of which are generally box-shaped in cross section, thus combining lightness with rigidity and strength. Expensive forgings are replaced with relatively cheap stampings.

The inner ends of the rib portions 14 of the upper stamping 10 are apertured as at 42 to receive the pivot bar bushings 44. Pivot bar bushings 44 have a head portion 46 and an internally threaded cylindrical portion 48 which is arranged to pass through the apertures 42 in the upper stamping 10. The head portion 46 of the pivot bar bushing is provided with a flat portion 50 (see Figures 5 and 7) for a purpose which will be described later. A bushing 44 is provided on each side of the upper stamping 10, and they extend toward each other in axial alignment. In order to maintain the bushings in place I have provided a snap ring 52 (see Figures 5 and 6) which ring fits into an annular groove in the cylindrical portion 48 after the head portion 46 of the bushing is brought against the outside of the box section 14. The ring 52 is arranged to engage the inside of the rib 14 as shown. The bushing is thus prevented from moving axially within the rib 14 by the head portion 46 and the snap ring 52.

The pivot bar 20 is provided with threaded end portions 54 (see Figures 5 and 6), which threaded portions are arranged to fit within the internally threaded portions of the bushings 44 and be supported thereby for rotation. The pivot bar is further provided towards its mid-section with two seats 56 which may be formed integrally with the pivot bar or independently fabricated and secured thereto by any suitable means. The seats 56 are apertured as at 58 to receive bolts by which the pivot bar may be fastened to the frame of the vehicle. It should thus be apparent that with the seats 56 and the pivot bar rigidly secured to the vehicle frame, my control arm may swing about the pivot bar as an axis and that the threaded connection between the pivot bar and pivot bar bushings 44 will create a friction force for absorbing a portion of the shock energy. It should be noted that each of the threaded end portions of bar 20 have right hand threads. There will be a consequent slight axial movement of the pivot bar with respect to the control arm although due to the small angular movement permitted the control arm, such axial movement is relatively small and inconsequential.

The outer ends of the box sections 14 are apertured as at 60 to receive a pin upon which the usual steering knuckle support arm (not shown) is pivoted. The particular method by which this steering knuckle support arm is connected to the lower control arm does not form a part of this invention and will therefore not be described further.

In order to facilitate assembly of my control arm with the pivot bar, it should be noted that the pivot bar bushings may be turned onto the threaded ends of the pivot bar after the pivot bar has been located in the apertures 42 in the upper stamping. After the bushings have been turned onto the pivot bar so that head portions 46 of the bushings abut against the upper stamping 10, the blocks 62 may be driven into the space between the flat portion 50 on the bushing head 46 and the outer flanges 22 of the upper stamping. If desired, ears (not shown) could be provided on flanges 22 to be turned up to hold plate 62 in assembled position. These blocks will prevent the bushing from turning after the assembly is complete. Snap rings 52 will prevent the bushings from moving axially as was explained before.

As is most clearly shown in Figure 5, the bushing heads 46 are apertured as at 64 and are provided with a fitting 66 by means of which lubricant may be forced into the internally threaded portion of the bushing. The ends of the pivot bar may be drilled as at 68 to deliver this lubricant to the threads between the pivot bar and the pivot bar bushings. It will be noted that apices of the threads both on the pivot bar and in the bushing are flattened off as at 70 (see Figure 6) so that the threaded parts have only 75% contact and form spiral grooves of triangular cross section as at 74. Lubricant reaches these grooves through the holes 68 in the pivot bar and will work along the grooves to lubricate the entire connection.

I have provided the aperture 74 in the cross brace 18 of the upper stamping so that the rubber bumper 76 indicated by the dotted lines in Figure 3 may be secured to the control arm if it is desired to limit the upward movement of the control arm by means other than the spring 32.

While I have described my invention in some detail, I intend this description to be an example only and not limiting on my invention to which I make the following claims:

1. A wheel suspension including a control arm formed of two stampings welded together, said stampings each having oppositely pressed out portions cooperating to form a plurality of hollow strengthening ribs in spaced converging relationship with spaced parallel ends.

2. A control arm for a wheel suspension formed as a stamping, said stamping having ribs formed therein, said ribs having spaced parallel end portions and converging center portions, aligned bushings fixed in one end of said ribs and having flat surfaces thereon, a pivot bar supported in said bushings, blocks positioned between said flat surfaces and parts of said stamping, the ends of said ribs opposite said bushings defining aligned apertures, and a spring seat portion formed in said stamping between said pivot bar and said apertures and between said ribs.

3. A control arm comprising a metal plate stamped to form converging ribs, said ribs being channel-shaped in cross section, aligned apertures in said ribs at their widest point, internally threaded bushings positioned in each of said apertures, snap rings for holding said bushings against movement within said ribs, and a pivot bar having threaded end portions received in said bushings.

4. A control arm comprising a metal plate stamped to form converging ribs, said ribs being channel-shaped in cross section, aligned apertures in said ribs at their widest point of separation from one another, internally threaded bushings positioned in each of said apertures, means for holding said bushings against movement, a pivot bar having threaded end portions received in said bushings, and means closing said ribs to form box sections.

5. A control arm comprising a metal plate stamped to form converging ribs, said ribs being channel-shaped in cross section, aligned apertures in said ribs at their widest point of separation from one another, internally threaded bushings positioned in each of said apertures, means for holding said bushings against movement, a pivot bar having threaded end portions received in said bushings, and a second stamping welded to said first stamping at the open side of said ribs for reinforcing said first stamping.

6. A control arm comprising a stamping, said stamping being shaped to form a pair of ribs channel-shaped in cross section, said ribs having spaced parallel end portions and converging center portions, a pair of braces between said ribs also channel-shaped in cross section and positioned intermediate of the ends of said ribs, a plate bounded by said ribs and said braces, and flanges formed around the remaining sides of said ribs and braces.

7. A control arm comprising two stampings, said stampings being shaped to form spaced converging ribs, braces formed on one of said stampings between said ribs and positioned intermediate of the ends of said ribs, said ribs being oppositely pressed out and joined to form hollow members, and flanges formed on the sides of said ribs.

8. A control arm for an independent wheel suspension comprising upper and lower sheet metal stampings, one of said stampings being provided with converging stiffening ribs formed therein and presenting open surfaces, the other stamping being secured to said one stamping and having portions bridging said open surfaces to form box sections with said ribs, said ribs being spaced at each end.

9. A control arm for an independent wheel suspension comprising a unitary sheet metal stamping having a flat horizontal flange extending about its exterior, a plurality of converging ribs formed in one surface of said stamping and raised above said exterior flange, said ribs extending along two sides of said stamping within said flange and being spaced at each end, and spaced transverse ribs joining said converging ribs.

10. A control arm for an independent wheel suspension comprising a unitary sheet metal stamping having a flat horizontal flange extending about its exterior, a plurality of ribs formed in one surface of said stamping and raised above said exterior flange, said ribs extending along two sides of said stamping within said flange and being joined by transverse ribs, and a central plate portion between said ribs provided with an upwardly annularly flanged spring centering portion.

11. A control arm for an independent wheel suspension comprising upper and lower sheet metal stampings, one of said stampings having side stiffening ribs and spaced transverse ribs extending therebetween formed therein and presenting open surfaces, the other stamping being secured to said first stamping and having portions bridging said open surfaces to form box sections with said ribs, the material of the stamping between said side ribs and transverse ribs toward the ends of said stamping being removed except for an internal flange.

12. A control arm for an independent vehicle wheel suspension comprising a unitary sheet metal stamping having ribs formed along its sides, reinforcing ribs formed adjacent each end of the stamping and united with said side ribs to form a rigid interbraced unit, flanges forming a part of said stamping and extending along both sides of said side and end ribs, and a second stamping positioned upon the first stamping on the side opposite the ribs and having portions bridging the open rib-channels of said first stamping and secured to said flanges on both sides of said ribs to form box sections with said ribs.

13. A control arm for an independent vehicle wheel suspension comprising a unitary sheet metal stamping having ribs formed along its sides, reinforcing ribs formed adjacent each end of the stamping and united with said side ribs to form a rigid interbraced unit, flanges forming a part of said stamping and extending along both sides of said side and end ribs, and a second stamping positioned upon the first stamping on the side opposite the ribs and having portions bridging the open rib-channels of said first stamping and secured to said flanges on both sides of said ribs to form box sections with said ribs, said bridging portions of said second stamping being deformed away from said rib to increase the section modulus of said box section.

14. A control arm for an independent vehicle wheel suspension comprising a unitary sheet metal stamping having ribs formed along its sides, reinforcing ribs formed adjacent each end of the stamping and united with said side ribs to form an interbraced unit, flanges forming a part of said stamping and extending along both sides of said side and end ribs, and a second stamping positioned upon the first stamping on the side opposite the ribs and having portions bridging the open rib-channels of said first stamping and secured to said flanges on both sides of said ribs to form box sections with said ribs, said bridging portions of said second stamping being deformed away from said rib to increase the section modulus of said box section.

15. A control arm for an independent wheel suspension comprising a unitary sheet metal stamping having channel shaped ribs formed therein, flanges turned outwardly from the open edge of said ribs, cylindrical bushings passed through the walls of said ribs, said bushings having a circular head, a flat surface formed on said circular heads, a block positioned between said flat surface and the flange at the bottom of said ribs, snap rings positioned around said bushings on the opposite side of said ribs from said heads, and a pivot bar supported in said bushings.

ROSS H. PHELPS.